Patented Apr. 5, 1938

2,113,358

UNITED STATES PATENT OFFICE 2,113,358

UNGELLED DRYING OIL PRODUCT

Floyd M. Reece and Matthew F. Taggart, South Bend, Ind.

No Drawing. Application May 11, 1936, Serial No. 79,200

8 Claims. (Cl. 87—12)

This invention relates to a method of heat treating drying oils.

In Reissue Patent No. 19,307, granted September 4, 1934 to Floyd M. Reece, is described a method of treatment of tung oil for the purpose of rendering it especially adaptable for use as a drying or base oil in the manufacture of paints and varnishes and plasticizing of lacquers. As therein described, the oil is heated very rapidly to a temperature of 625° F. or higher, the heating operation being carried forward with such rapidity that the formation of a gel is avoided while the oil is passing through the temperature range of, say 550 to 600°, in which such gel formation ordinarily takes place. The oil is then maintained at the higher temperature—that is, preferably above 625° F. for a very short time and cooled below a gelling temperature. This entire heating period is normally about 15 seconds for a temperature of 675° F.

As therein described, the apparatus for carrying out the invention consists of an elongated heated restricted passageway, such as a pipe coil, provided with suitable heating means through which the oil is rapidly passed and is then passed to another pipe coil wherein it is rapidly cooled. It is preferable to pass the oil through the coil under superatmospheric pressure, for example, 15 to 35 pounds, or even higher, inasmuch as the pressures tend to avoid the separation of gas in the pipe.

As described in the Reece patent, the following is a specific example of that process:

Untreated China-wood oil was passed, under a pressure of 25 pounds, through a coil formed of 60 feet of one-half inch inside diameter copper tubing. The coil was of spiral or helical form and was mounted in a gas-fired furnace. The oil was charged into the coil at a temperature of 75° F. and at a rate of 45 gallons per hour. The oil was discharged from the coil at a temperature of 675° F. and was immediately passed into a coil, immersed in a cooling fluid, wherein it was cooled to a temperature of 200° F. The cooled oil was thereupon passed to a receiving drum wherein any gases separate from the oil.

The oil resulting from such treatment has remarkably improved drying properties over the untreated oil, especially notable in that the tendency of the oil to frost during drying has been eliminated or greatly minimized.

The treatment of tung oil heretofore described in the Reece patent resulted in an increase in gravity and acid number, and a decrease in iodine number and index of refraction. The treatment also resulted in an increase in viscosity.

It has now been discovered that other oils may likewise be improved by similar treatment.

For example, ordinary varnish makers linseed oil was subjected to heat treatment, being brought to a maximum temperature of 675° F. and under a pressure of approximately 400 pounds while passing through a coil, the time of treatment being approximately 22 seconds and with the following results:

Example I

|  | Treated oil | Untreated oil |
|---|---|---|
| Ref. index | 1.4834 | 1.4814 |
| Viscosity | 28 sec. | 17 sec. |
| Sp. gravity | .936 | .930 |
| Acid value | 4.9 | 2.43 |
| Saponification | 196 | 194 |
| Iodine number (Wijs) | 158 | 185 |

Further it has been discovered that oiticica oil shows generally the same results when subjected to the process of the Reece patent as does tung oil. Like tung oil it is a gelling oil and must be rapidly heated to a cracking temperature to avoid gelling.

It has been further discovered that a mixture of equal parts of raw tung oil and linseed oil when treated by the same process at approximately the same temperatures and pressure and for the same time gives the following results, the acid number of the jointly treated oils being much less than separately treated oils mixed after treatment.

Example II

|  | Treated oil | Untreated oil | C |
|---|---|---|---|
| Ref. index | 1.4944 | 1.5030 | 1.4917 |
| Viscosity | 2' 26" | 36" | 1' 39" |
| Sp. gravity | .954 | .934 | .953 |
| Acid value | 6.83 | 2.85 | 10.84 |
| Saponification | 185 | 194 | 190 |
| Iodine No. (Wijs) | 143 | 172 | 144 |

Column C shows the same oils separately heat-treated and mixed in these proportions after treatment.

Similar results may be obtained by the conjoint treatment of tung oil with linseed, perilla, soya bean, safflower, sunflower, fish, hempseed, oiticica, or other drying oils, or a combination of any two or more of such oils with each other. Owing to the value of tung oil for paint and varnish purposes, it is preferred to combine it with one or more of the others, but so far as the process is concerned, similar results may be obtained without tung oil by a combination of two or more of the other oils. The temperature and time of treatment will vary somewhat with the character of the oil. With tung oil the temperature is preferably from 650° to 900°, the time being altered in accordance with the temperature to prevent gelling and produce the desired drying oil.

In general, the proportion of each oil will exceed 25% of the mixture, and should exceed 10%.

The invention is particularly applicable to the treatment of soya bean oil, which at the present time can be incorporated in paints only to a very limited extent without destroying the practical drying value thereof. The joint treatment of tung or oiticica oil with soya bean oil by the present process produces a new product which will produce satisfactory paints with large proportions of soya bean oil. For instance, mixtures of 55% tung oil and 45% soya bean oil treated by this method have produced satisfactory paint. Soya bean oil may likewise be improved by treatment with non-gelling oils like linseed or perilla, but by no means to the same extent.

The following is an example of the change in a mixture of 55% tung oil and 45% soya bean oil when thermolyzed at approximately 710° F. for 22 seconds under 400 pounds pressure.

*Example III*

|  | Treated oil | Untreated oil | C |
|---|---|---|---|
| Ref. index | 1.4910 | 1.4957 | 1.4860 |
| Viscosity | 3' 30'' | 32'' | 1' 33'' |
| Sp. gravity | .950 | .930 | .950 |
| Acid value | 5.0 | 2.2 | 7.0 |
| Saponification | 184 | 193 | 187 |
| Iodine No. (Wijs) | 108 | 143 | 109 |

Column C shows the separately heat treated oils mixed in the same proportion after treatment.

In the case of the treatment of a plurality of non-gelling oils hereunder the extremely rapid heating is not necessary as a means to avoid gelling but it is preferred to heat to a cracking temperature rapidly to avoid loss of drying properties.

The present process has the further advantage that it enables the manufacturer to produce an absolutely uniform product under exactly controlled continuous operation.

The chemical reactions responsible for our improvement are not known. It is believed, however, that the heating above 625°, which produces a cracking reaction, causes an intercombination of the oil molecules with each other. In the case of the tung and soya bean oils, for example, this appears to transfer some of the extremely rapid drying properties of the tung oil to the slower drying soya bean oil. The result is entirely different than is produced by mixing separately heat treated soya and tung oils.

The foregoing detailed description has been given for clearness of understanding only, and no unnecessary limitations should be understood therefrom, but the appended claims should be construed as broadly as permissible in view of the prior art.

We claim:

1. A liquid ungelled drying oil product comprising a jointly heat treated mixture of a gelling drying oil and at least one other drying oil, the gelling oil being at least 10% and the other oil or oils being at least 10% of the mixture, the oils having been jointly rapidly heated to bring the mixture to a temperature of at least 625° F. under superatmospheric pressure in a period of time sufficient to secure substantial reduction of the refractive index, and increase of specific gravity, acid number and viscosity of the oils, and so short as not to permit gel formation, said period being suitably of the order of twenty-two seconds for a temperature of 675° F., and the resulting product having a substantially lower acid number and a substantially higher viscosity than a mixture of the same oils in the same proportion individually subjected to the same heat treatment.

2. A product as set forth in claim 1 in which the gelling oil is tung oil, and the other oil or oils are of the class consisting of oiticica, linseed, perilla, sunflower, soya, fish and hempseed oils.

3. A product as set forth in claim 1 in which the mixture comprises at least 25% of each of two oils.

4. A product as set forth in claim 1 in which one oil is tung oil and another oil is linseed oil.

5. A product as set forth in claim 1 in which the mixture comprises substantially equal portions of tung and soya bean oil.

6. A product as set forth in claim 1 in which the mixture comprises substantially equal portions of tung and linseed oil.

7. A paint varnish or lacquer including the drying oil product of claim 1.

8. A product as set forth in claim 1 in which one oil is tung and another oil is soya bean oil.

FLOYD M. REECE.
MATTHEW F. TAGGART.